No. 688,927. Patented Dec. 17, 1901.
M. G. BUNNELL.
ROLLER BEARING VEHICLE WHEEL.
(Application filed Nov. 10, 1900.)
(No Model.) 2 Sheets—Sheet 1.

Witnesses:
A. F. Durand
A. L. Olsen

Inventor:
Morton G. Bunnell.
by Chas. L. Page
Atty.

No. 688,927. Patented Dec. 17, 1901.
M. G. BUNNELL.
ROLLER BEARING VEHICLE WHEEL.
(Application filed Nov. 10, 1900.)
(No Model.) 2 Sheets—Sheet 2.
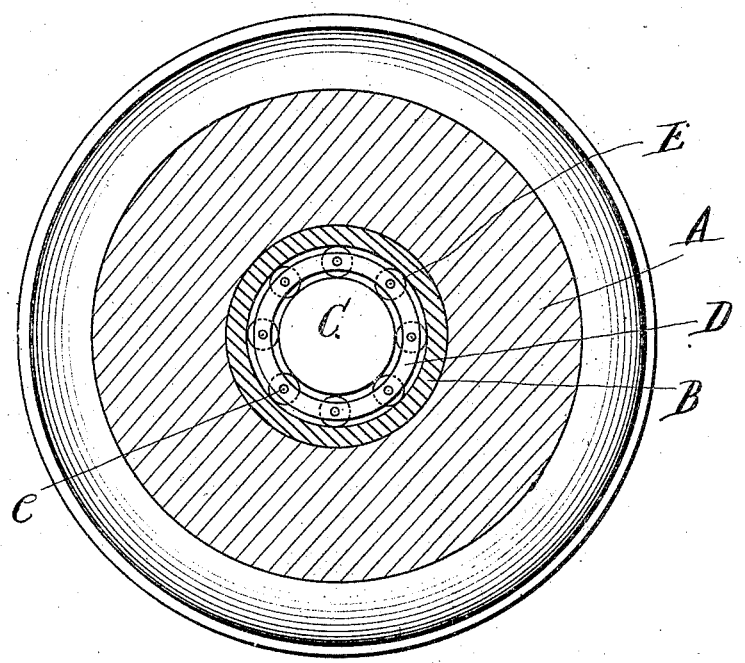
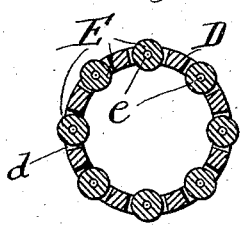
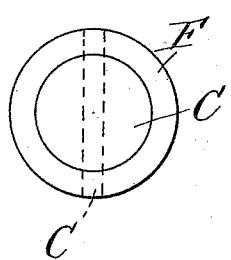
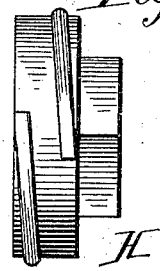
Witnesses:
A. F. Dmand
A. L. Olsen
Inventor:
Morton G. Bunnell,
by Chas. L. Page Atty.
THE NORRIS PETERS CO., PHOTO-LITHO., WASHINGTON, D. C.

UNITED STATES PATENT OFFICE.

MORTON G. BUNNELL, OF CHICAGO, ILLINOIS, ASSIGNOR TO FREDERICK C. AUSTIN, OF CHICAGO, ILLINOIS.

ROLLER-BEARING VEHICLE-WHEEL.

SPECIFICATION forming part of Letters Patent No. 688,927, dated December 17, 1901.

Application filed November 10, 1900. Serial No. 36,144. (No model.)

*To all whom it may concern:*

Be it known that I, MORTON G. BUNNELL, a citizen of the United States, residing at Chicago, in the county of Cook and State of Illinois, have invented a certain new and useful Improvement in Roll-Bearing Vehicle-Wheels, of which the following is a specification.

My invention relates to vehicle-wheels of the kind in which antifriction-rolls are arranged between the wheel and the axle-spindle.

The objects of my invention are to provide a simple, compact, easy-running, and generally efficient construction, to prevent dust from having access to the antifriction-rolls, to provide increased lubricating facilities, to adapt the parts to be readily made, put together, and detached, to avoid undesirable friction, and to provide certain improved details serving to generally increase the desirability and serviceability of roller-bearing wheel-hubs.

Figure 1:
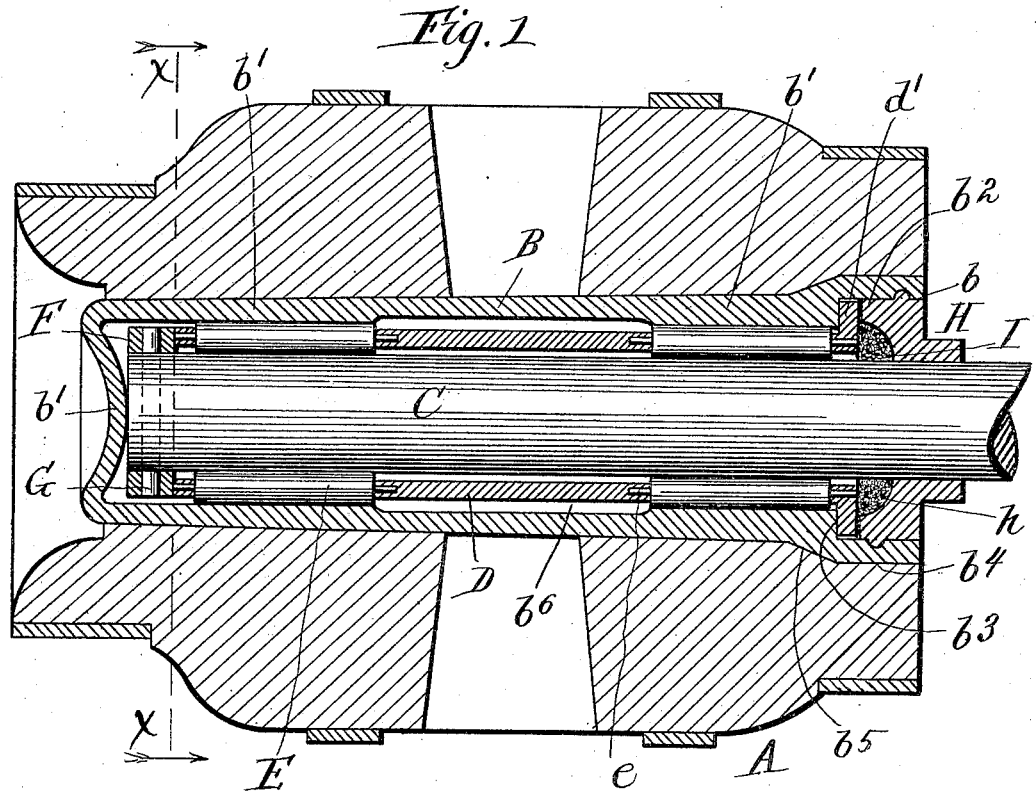
Figure 2:
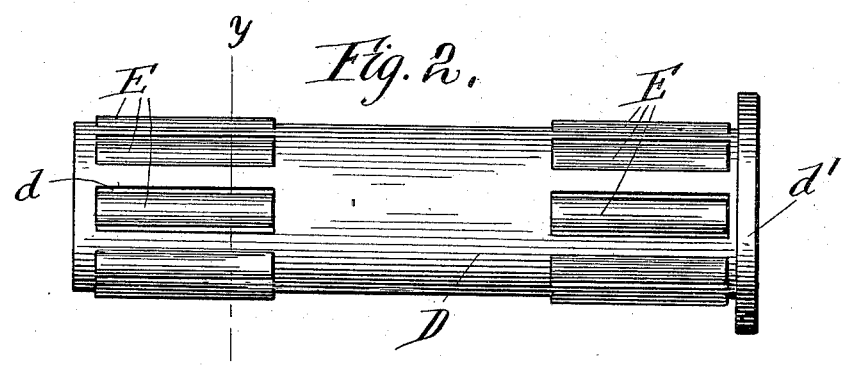

In the accompanying drawings, Figure 1 is a longitudinal section on a vertical central plane through the wheel-hub and my improved adjuncts, the axle-spindle being in elevation and the spokes of the wheel-hub omitted. Fig. 2 is a side view of the sleeve provided with antifriction-rolls. Fig. 3 is a transverse section on line $xx$ in Fig. 1. Fig. 4 is a transverse section through the sleeve and antifriction-rolls on line $yy$ in Fig. 2. Fig. 5 is an end view of the outer end of the axle-spindle with the stop or collar F thereon, the securing-pin being illustrated by dotted lines. Fig. 6 is a side view of the wearing-cap nut. Fig. 7 is a section taken longitudinally through one of the antifriction-rolls, the small rod or spindle which extends through an axial bore in the roll to provide the roll with end journals being shown in side view.

The wheel-hub A is provided with an axial bore and internally lined by the hub-box B, which is fitted and secured within the axial bore of the wheel-hub. The hub-box B is formed with an open inner end $b$ and provided with a closed outer end $b'$. The closed outer end $b'$ of the hub-box is internally rounded or adapted to provide a central rounded bearing, which bears against the outer end of the spindle portion C of the axle and serves to reduce friction during the rotation of the hub and its internally-secured hub-box. The spindle C extends through a sleeve D, which is arranged as a jacket about the spindle and confined within an annular space between the spindle and the hub-box. The sleeve D is provided with a couple of sets of longitudinal slots or openings $d$, respectively, near one and the other of the two ends of the sleeve, each set being arranged to form an annular series of openings for antifriction-rolls E, which are arranged within such slots or openings. The antifriction-rolls E are provided at their ends with journals $e$, which are journaled in the end walls of the openings in the sleeve, so as to prevent the antifriction-rolls from engaging the longitudinal edges of such openings, the latter, as illustrated, being wider than the diametric measurements of the antifriction-rolls. The antifriction-rolls are arranged between and engage both the spindle and internal bearing portions $b'$ $b'$ of the hub-box, the internal and external diametric proportions of the sleeve being such with relation to the hub-box, the spindle, and the antifriction-rolls that the sleeve, which extends along the annular space between the spindle and the hub-box, will be out of contact with said two last-mentioned members. The outer end of the sleeve D abuts against a stop or collar F, which is detachably secured upon the outer end of the spindle, for example, by a pin G, which passes through diametric holes in the stop or collar and the spindle.

The inner end portion of the bore of the hub-box is formed with a lateral or diametric enlargement $b^2$, adapted to provide at one end thereof an annular shoulder $b^3$, and the inner end of the sleeve is provided with an annular flange $d'$, arranged to abut against such annular shoulder. The inner end flange of the sleeve is confined between the internal shoulder of the hub-box and a wearing-cap H, which is arranged upon the spindle and adjustably and detachably connected with the hub-box, a simple mode of coupling the end cap with the hub-box being a screw connection. The arrangement illustrated involves compact and simple means, consisting of a cap-nut screwed within the internally-threaded enlarged bore portion $b^2$ of the hub-box. By such arrangement the inner end portion of the hub-box can also be made with an external diametric enlargement, as at $b^4$, and an annular beveled shoulder $b^5$, and thus formed it can be driven within a correspondingly-shaped bore in the wheel-hub. The end cap H is also provided with an annular groove or concavity $h$ in its end opposite the end flange of the sleeve, and suitable packing I can be placed within such groove or concavity, and thus be arranged between the end cap and the sleeve, so as to prevent dust from having access to the antifriction-rolls.

Any suitable quantity of lubricant can be introduced within the hub-box, and to provide additional space for such lubricant the bore portion of the hub-box between the two sets of antifriction-rolls is laterally or diametrically enlarged, as at $b^6$.

When the several parts or members hereinbefore described are organized and fitted together as in Fig. 1, the hub-box B, which is rigid with the hub, will rotate about the spindle and bear upon the antifriction-rolls, which provide rolling supports between the hub-box and the axle, it being observed that the end flange of the sleeve need not be tightly clamped between the wearing cap or nut and the annular shoulders $b^3$ in the bore of the hub-box and that the periphery of such annular flange of the sleeve need not fit close against the cylindric wall of the enlarged bore portion $b^2$ of the hub-box. By such arrangement the sleeve or long collar D is practically loose and supported by the antifriction-rolls, and being arranged with its outer end opposite the stop or collar F on the spindle and with the flange on its inner end confined between the wearing-cap nut and a shoulder $b^3$ in the hub-box it will prevent the wheel-hub from working off the spindle. During operation the antifriction-rolls revolve about the spindle and also rotate about their individual axes, it being observed that there will be no special strain upon the journals $e$ of such antifriction-rolls and that while the rolls will revolve independently of the sleeve the latter will revolve about the axis of the axle-spindle, so as to allow the rolls to have a general bodily revolution about such axis.

By thus providing a long sleeve having two series of openings a strong and durable structure adapted to withstand end thrust is secured, and by boring the sleeve back from its ends to provide bearings for the journals or rod-spindles $e$, as illustrated, the sleeve can be made in one piece from end to end and at the same time suitable bearings for the roll-journals can be readily formed in the end walls of the slots or openings.

What I claim as my invention is—

1. The combination with an axle-spindle, of a wheel-hub provided with an internally-secured bushing or hub-box; an integral sleeve arranged between the axle-spindle and bushing or hub-box and provided with longitudinal openings; antifriction-rolls arranged within the longitudinal openings of the sleeve and bearing against the axle-spindle and the bushing or hub-box; and a wearing cap or nut connected with the wheel-hub and arranged to turn upon the spindle; an inner end portion of the sleeve being opposed to the wearing cap or nut, and the axle-spindle being provided with a stop which is engaged by the sleeve.

2. The combination with a wheel-hub and a hub-box secured therein; of the axle-spindle extending centrally within the hub-box and formed to leave an annular space between the two; a cylindric sleeve arranged between the axle-spindle and the hub-box and provided with two sets of longitudinal slots formed through its end portions and arranged in annular series; antifriction-rolls arranged within the slots of the sleeve and bearing against the spindle and the inner wall of the hub-box; and spindle-rods forming journals for the antifriction-rolls; the sleeve bored longitudinally back from its ends to provide bearings for the spindle-rods at opposite ends of the slots and to permit the spindle-rods to be inserted in such bearings and also thrust through axial bores with which the antifriction-rolls are provided.

3. The hub of a vehicle-wheel provided with an internally-secured hub-box closed at its outer end, and having a diametrically-enlarged inner end portion of its bore; in combination with the axle-spindle diametrically proportioned to provide an annular space between the axle-spindle and the hub-box; antifriction-rolls; a sleeve arranged within the space between the axle-spindle and the hub-box and supported by the said antifriction-rolls arranged in annular series in openings formed through the sleeve and receiving such antifriction-rolls; and a wearing cap or nut adjustably secured within the enlarged bore portion of the hub-box; the sleeve being provided at its inner end with a flange which is confined between the wearing cap or nut and a shoulder within the bore of the hub-box; and the axle-spindle being provided at its outer end with a stop arranged opposite the outer end of the sleeve.

4. The hub of a vehicle-wheel provided with an internally-secured hub-box closed at its outer end; in combination with the axle-spindle; a sleeve arranged within an annular space between the axle-spindle and hub-box and provided with longitudinal openings arranged in annular series; antifriction-rolls arranged within the openings in the sleeve and engaging the axle-spindle and hub-box; a wearing-cap nut adjustably secured to the hub-box and recessed to receive packing which is confined within such recess and arranged between the wearing-cap nut and the inner end of the sleeve; the said sleeve being provided at one end with a flange which is confined between the wearing-cap nut and an internal portion of the hub-box, and said sleeve being also held as against end movement independently of and toward the end of the axle-spindle.

5. The combination with a vehicle-wheel hub containing a hub-box secured therein; of an axle-spindle; two sets of antifriction-rolls, a sleeve provided at one end with a flange and carrying such two sets of antifriction-rolls arranged in annular series; and a dust-proof cap arranged at one end of the hub; the flange on the sleeve being confined between the cap and a portion of the hub-box, and the spindle being provided with a stop opposite the outer end of the sleeve.

6. The combination of the wheel-hub provided with an internally-secured hub-box having its outer end closed and internally rounded to form an end bearing for the axle-spindle; the axle-spindle having its outer end arranged to contact with said rounded end bearing portion of the hub-box; antifriction-rolls, a sleeve arranged about the axle-spindle and carrying the antifriction-rolls which contact with the hub-box and the axle-spindle; and a substantially dust-proof cap arranged about the axle-spindle and closing the inner end of the bore of the hub-box; the axle-spindle being provided with a stop arranged in opposition to independent end movement of the sleeve in one direction, and the sleeve having an inner end portion arranged in opposition to the dust-proof cap.

MORTON G. BUNNELL.

Witnesses:
A. CAMERON,
J. F. CONE.